United States Patent [19]

Kurosawa et al.

[11] Patent Number: 5,289,167
[45] Date of Patent: Feb. 22, 1994

[54] DISPLAY APPARATUS CAPABLE OF PROCESSING DISTANCE INFORMATION

[75] Inventors: Kazuyuki Kurosawa, Tokyo; Atsushi Shibutani, Tokorozawa, both of Japan

[73] Assignee: Casio Computer Co., Ltd., Tokyo, Japan

[21] Appl. No.: 764,622

[22] Filed: Sep. 24, 1991

[30] Foreign Application Priority Data

Sep. 28, 1990 [JP] Japan .................. 2-259095
Sep. 28, 1990 [JP] Japan .................. 2-259096

[51] Int. Cl.5 ............................ G09F 19/00
[52] U.S. Cl. ...................... 340/461; 340/995; 358/903; 364/424.03
[58] Field of Search ............ 340/439, 461, 462; 358/903; 73/490; 364/424.03, 424.04, 467, 561

[56] References Cited

U.S. PATENT DOCUMENTS

| | | | |
|---|---|---|---|
| 4,216,530 | 8/1980 | Yamaki et al. | 364/565 |
| 4,263,657 | 4/1981 | Oka et al. | 364/561 |
| 4,373,116 | 2/1983 | Shimizu | 340/461 |
| 4,383,301 | 5/1983 | Morita et al. | 364/562 |
| 4,396,941 | 8/1983 | Nishimura | 358/189 |
| 4,914,831 | 4/1990 | Kanezashi et al. | 33/780 |
| 5,027,296 | 6/1991 | Yamaguchi et al. | 364/562 |
| 5,062,063 | 10/1991 | Shimizu | 364/562 |

FOREIGN PATENT DOCUMENTS 2048532 12/1980 United Kingdom ............... 340/461

*Primary Examiner*—Hezron E. Williams
*Assistant Examiner*—Christine K. Oda
*Attorney, Agent, or Firm*—Frishauf, Holtz, Goodman & Woodward

[57] ABSTRACT

A display apparatus having a calculation function, comprises a measurement unit for measuring a distance; an input unit for inputting either time information or velocity information; a calculation unit for calculating either time information or velocity information based on a measurement result of the measurement unit and either the time information or velocity information inputted by the input unit; and a display unit. A calculation result obtained from the calculation unit is displayed on the display unit.

18 Claims, 18 Drawing Sheets

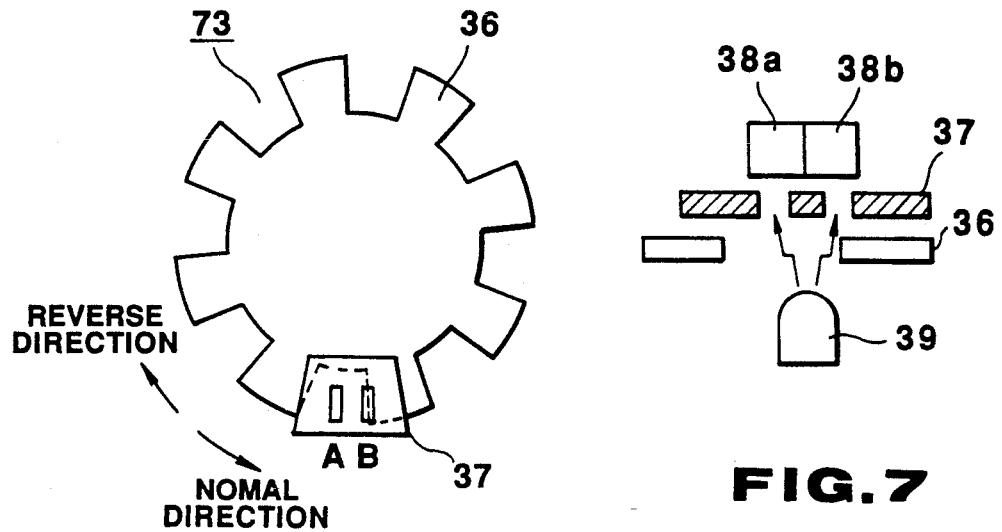
FIG. 6
FIG. 7
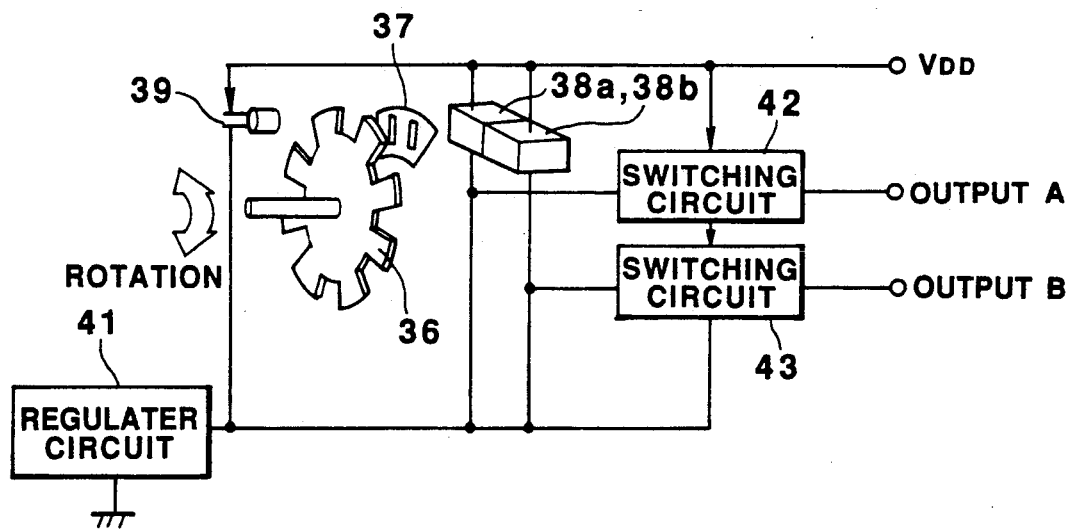
FIG. 8

| | 25 |
|---|---|
| R1 | CHANNEL NUMBER |
| R2 | SOUND VOLUME VALUE |
| R3 | BRIGHTNESS VALUE |

| | | | | | |
|---|---|---|---|---|---|
| R4a~R4e | SCALE MEMORY 1 | SCALE MEMORY 2 | SCALE MEMORY 3 | SCALE MEMORY 4 | SELECTION NO. |
| R5 | DISTANCE VALUE IN MAP MODE | | | | |
| R6 | LENGTH VALUE IN MEASUREMENT MODE | | | | |
| R7 | TIME ELAPSE 1 | | | | |

| | | | |
|---|---|---|---|
| R8a~R8c | REMAINING DISTANCE OF PAGE UNDER EXECUTION | PRESENT VELOCITY OF PAGE UNDER EXECUTION | REMAINING TIME OF PAGE UNDER EXECUTION |
| R9a~R9c | SCHEDULED TIME P1 | P2 | P3 |
| R10a~R10c | SCHEDULED VELOCITY P1 | P2 | P3 |
| R11a~R11c | SCHEDULED DISTANCE P1 | P2 | P3 |
| R12a~R12c | RESULTANT TIME P1 | P2 | P3 |
| R13a~R13c | RESULTANT VELOCITY P1 | P2 | P3 |
| R14a,R14c | INITIAL VALUE OF TIME ELAPSE | | CORRECTED TIME ELAPSE |
| R15a~R15c | METER INITIAL VALUE | METER CORRECTED VALUE | METER PRESENT VALUE |
| R16a,R16b | PRESENT PAGE | | OPERATION MODE |
| R17 | TIME ELAPSE 2 | | |

FIG. 9

DISPLAY APPARATUS CAPABLE OF PROCESSING DISTANCE INFORMATION

BACKGROUND OF THE INVENTION

1. Field of the Invention

The present invention generally relates to an image display apparatus capable of processing distance information. More specifically, the present invention is directed to an automobile mount type television receiving apparatus equipped with a map meter function.

2. Description of the Prior Art

Very recently, liquid crystal television receivers equipped with a liquid crystal display panel have been widely utilized. In particular, such liquid crystal television receivers are mounted on automobiles. However, these automobile mount type liquid crystal television receivers merely have the function to receive television broadcasting programs, but have no other functions specific to car use.

On the other hand, a so-called "map meter" has been marketed so as to actually measure a distance over positions on a map, while moving on a surface of this map. Also, wrist watches equipped with the function of a map meter are recently commercially available. However, this type of map meters have small-sized display units, which is difficult to observe, and also merely represent the distances. This implies that such wrist watches do not have a drive guidance function.

On the other hand, there have been marketed automobiles equipped with navigation functions. However, since such automobile navigation systems require satellites and CD-ROM (Compact Disk-Read-Only Memory), there are problems of large-sized apparatus and very high cost.

SUMMARY OF THE INVENTION

The present invention has been made in an attempt to solve the above-described various problems, and therefore has an object to provide an image display apparatus including a television receiver and a map meter function, which is easily observed and manufactured at lower cost.

An image display apparatus with a calculation function for processing distance information, according to the present invention, comprises.

measurement means for measuring a distance; input means for inputting time information; calculation means for calculating a velocity from both a distance measurement result of the measurement means and the time information inputted from the input means; and display means for displaying a calculation result made by the calculation means.

With such an arrangement, the image display apparatus according to the present invention can readily provide suitable auto-drive information so that travel schedules may be easily and precisely established.

BRIEF DESCRIPTION OF THE DRAWINGS

FIG. 6 represents a positional relationship between a rotating slit plate and a fixed slit plate;

FIG. 7 represents a positional relationship among a LED, a rotating slit plate, a fixing slit plate and a photo transistor;

FIG. 8 shows a construction of the remote controller for converting rotations of a gear into electric signals;

FIG. 9 illustrates a memory map of an EEPROH;

DETAILED DESCRIPTION OF THE PREFERRED EMBODIMENTS

Referring now to drawings, a liquid crystal television apparatus equipped with a so-called "map meter", to which the present invention has been applied, will be described.

Figure 1A:
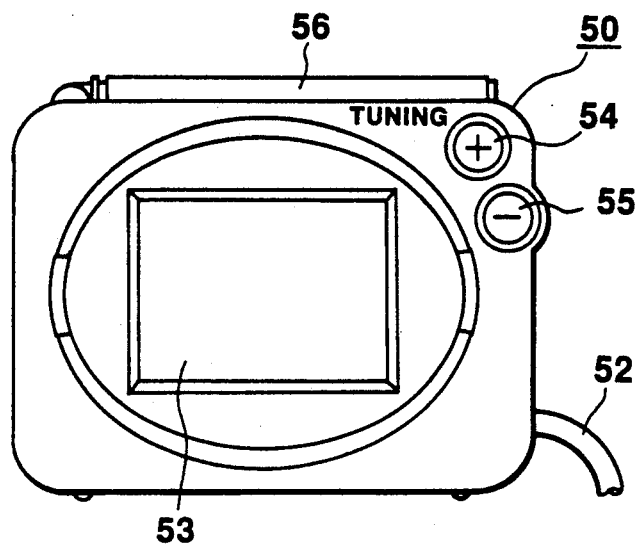
FIG. 1A is a perspective view of a main body of an image display apparatus according to a preferred embodiment of the present invention.
Figure 1B:
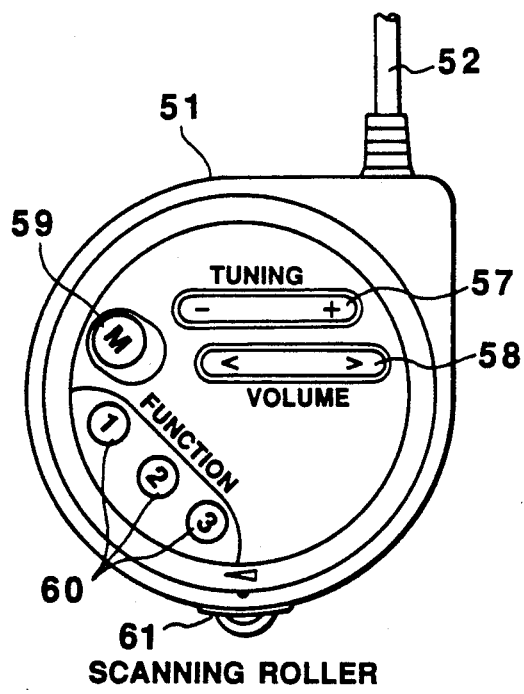
FIG. 1B is a front view of a remote controller of the image display apparatus shown in FIG. 1A.
Figure 1C:
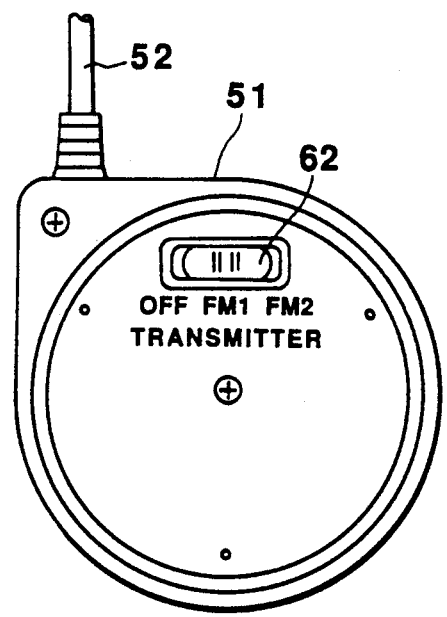
FIG. 1C is a rear view of the remote controller shown in FIG. 1B.

In FIG. 1, there is shown an outward appearance of the liquid crystal television apparatus according to one preferred embodiment of the present invention. The liquid crystal television apparatus is so constructed of a television main body 50 shown in FIG. 1A; a remote controller 51 shown in FIGS. 1B and 1C, and a connection cable 52 for connecting the television main body 50 and the remote controller 51.

In the television main body 50, there are arranged a display unit 53 comprising a color liquid crystal display panel at a front plane of a housing; a tuning up (+) key 54 and a tuning down (−) key 55 used for an automatic tuning operation; and also a rod antenna 56 at an upper plane of the housing. Although not shown in these drawings, various key switches such as a power ON/-OFF key, a variable resistor control key and a bright control key are provided at a side plane of this housing.

As shown in FIG. 1B, a tuning up/down key 47, a variable resistor up/down key 58, a mode changing key 19 and function (1 to 3) keys 60 are provided at a surface of the remote controller 51. The mode changing key 59 is employed to cyclically change various operation modes performed in this liquid crystal television apparatus. The function keys 60 are to designate specific functions when the various operation modes are set. The contents of the respective functions are displayed at a lower portion of the display unit 53 every time the relevant function key ("1" to "3") is operated.

Furthermore, although not shown in the drawing, a peripheral surface of the remote controller 51 comprises a rotary bezel structure, and a scanning roller 61 used as the map meter is projected from a portion of this bezel structure. FIG. 1B represents such a condition that this scanning roller 61 is positioned at a predetermined position, for instance, at a lower side. In this state, a projection portion of the scanning roller 61 is located in contact with a desired position on a map (not shown in detail), and is scanned over a desired route so that the scanning roller 61 is rotated and thus a distance of this desired route can be calculated.

An FM transmitter selecting switch 62 is provided on a rear plane of the remote controller 51 as shown in FIG. 1C. The FM transmitter selecting switch 62 has a function to select operations of the FM transmitter built in the remote controller 51. That is, when this switch 62 is selected to "OFF", no FM signal is transmitted; when the switch 62 is selected to "FM1", an FM signal having a preset first frequency is transmitted; and when the switch 62 is selected to "FM2", an FM signal having a preset second frequency is transmitted. Then, when this FM transmitter selecting switch 62 is selected to either "FM1" or "FM2" and also a reception frequency of an FM radio (not shown) mounted on an automobile (not shown either) on which this liquid crystal television apparatus has been mounted, is tuned to this selected FM frequency "FM1" or "FM2", a sound output from a television broadcasting station received by the liquid crystal television apparatus is reproduced not from a speaker built in the television body, but from this FM radio.

The above-described liquid crystal television apparatus is equipped with 4 different modes, namely, "television", "measurement", "map" and "navigation". The "television" mode is a basic mode. In the "television" mode, the normal television broadcasting programs are received under control of the normal television controls such as tuning, sound volume, and brightness. When the mode changing key 59 is operated under the television mode, other operation modes are sequentially selected. When this changing key 59 is operated four times from the television mode, then the operation mode is returned to this television mode.

In the "measurement" mode, an object to be measured is scanned by the scanning roller 61 of the remote controller 51 thereby to display an actual measurement value (a length) thereof on the display unit 53.

In the "map" mode, a map is scanned by the scanning roller 61 of the remote controller 51 and a distance of the scanned place is calculated with selecting a reduced dimension of this map, whereby the calculated distance is displayed on the display unit 53.

In the "navigation" mode, both a scheduled distance and a scheduled velocity, and also one scheduled time are inputted before drive, and either an average velocity, or time from departure to arrival is displayed. This schedule may be subdivided into three portions (hereinafter referred to as "pages") and may be continuously set. For example, a route from a highway via an expressway to a highway is schemed and either time or average velocity may be set with respect to each of the sections.

ARRANGEMENTS OF TELEVISION MAIN BODY AND REMOTE CONTROLLER

Figure 2:
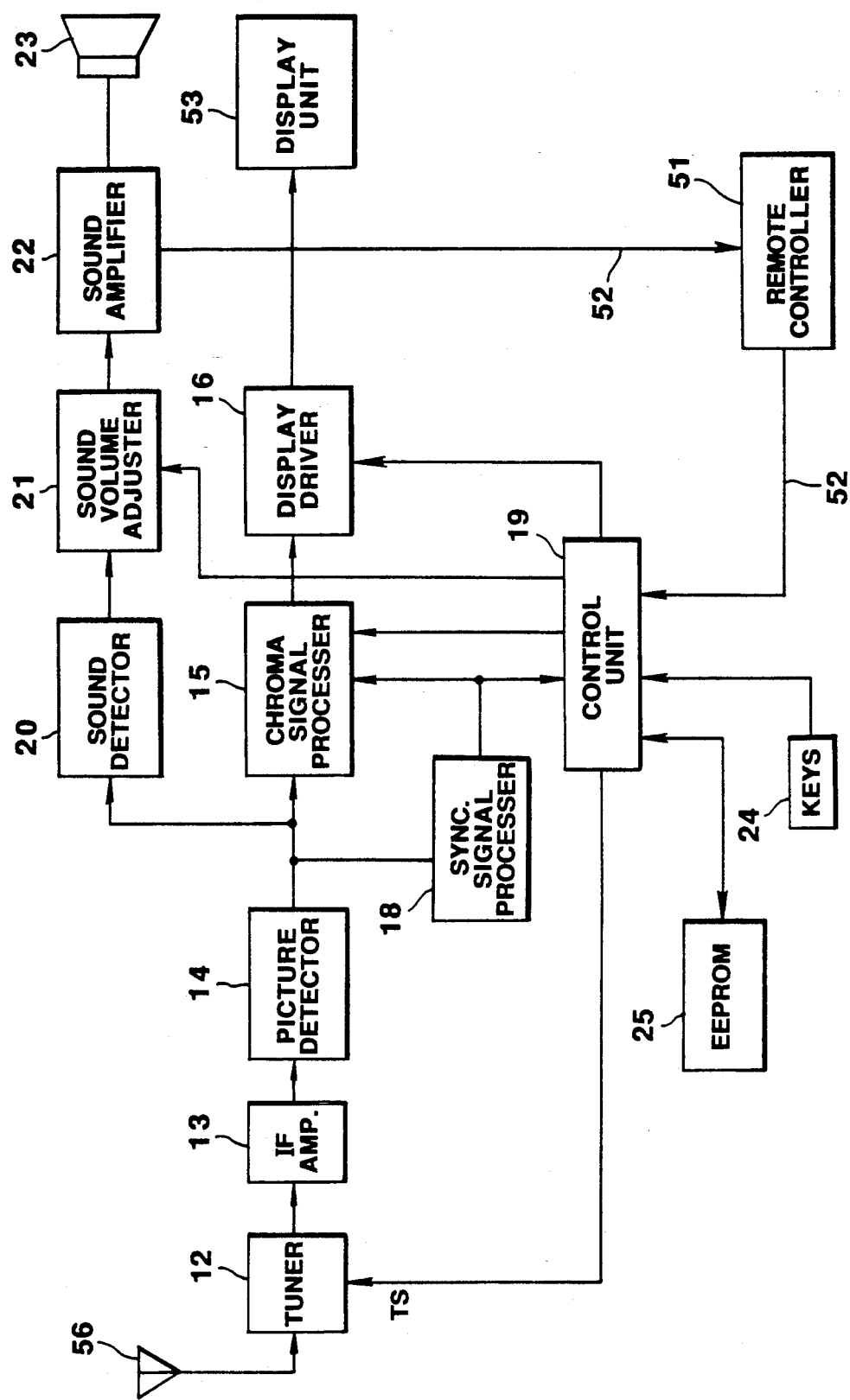
FIG. 2 is a schematic block diagram of an entire circuit diagram of the image display apparatus shown in FIG. 1A.

FIG. 2 is a schematic block diagram for mainly showing a circuit arrangement of the television main body 50. In FIG. 2, a television broadcasting signal received by the rod antenna 56 is inputted into a tuner 12. The tuner 12 selects a designated TV channel in response to a control signal "TS" of a control unit 19 and the broadcasting signal of the tuned TV channel is converted into an intermediate frequency signal which will be then fed to an intermediate-frequency amplifier circuit 13. The intermediate frequency amplifier 13 amplifies the intermediate-frequency signal sent from the tuner 12 and outputs the amplified intermediate frequency signal to a picture detecting circuit 14. The intermediate-frequency amplifier circuit 13 is equipped with an AFT (auto-frequency tuning) detecting circuit (not shown in detail). A portion of the intermediate-frequency signal is AFT-detected and then the AFT detected signal, namely an AFT signal is outputted to the control unit 19. The picture detecting circuit 14 detects the intermediate frequency signal supplied from the intermediate-frequency amplifying circuit 13 and outputs the detected signal to a chroma (chrominance) signal processing circuit 15 and a synchronization signal processing circuit 18. The synchronization signal processing circuit 18 separates both a horizontal synchronization signal and a vertical synchronization signal contained in the picture signal, which are supplied to the chroma signal processing circuit 15 and the control unit 19. Also, a control signal is supplied to the chroma signal processing circuit 15 from the control circuit 19.

The chroma signal processing circuit 15 processes the picture signal derived from the picture detecting circuit 14 so as to obtain R, G and B color signals which are then supplied to a display drive circuit 16 in response to the synchronization signal from the synchronization signal processing circuit 18 and the control signal from the control unit 19. This display drive circuit 16 drives the display unit 53 in response to a timing signal and a luminance (Y) signal supplied from the control unit 19.

A portion of the output signal from the picture detecting circuit 14 is supplied to a sound detecting circuit 20 thereby to derive a sound (acoustic) signal. A sound level of this sound signal is adjusted by a sound volume adjusting circuit 21 and the resultant signal is supplied to a sound amplifier circuit 22. After the second signal has been amplified at a predetermined amplification by this sound amplifier circuit 22, the amplified sound signal is reproduced by a speaker 23, or transmitted via a connection cable 52 to the remote controller 51.

To the above-described control unit 19, the remote controller 51 is connected via keys 24 of the main body, EEPROM 25 and the connection cable 52. These keys 24 of the main body include the tuning up key 54, tuning down key 55, power ON/OFF key, sound volume adjusting key, brightness adjusting key and so on.

EEPROM 25 stores operation data on various modes and these operation data may be rewritten by the control unit 19.

Then, the control unit 19 performs various control operations in response to the signals derived from the main body's keys 24 or the remote controller 51. For instance, this control unit 19 furnishes a channel selection instruction TS to the tuner 12, a sound volume adjusting signal to the sound volume adjusting circuit 21 and a luminance adjusting signal to the display drive circuit 16.

INTERNAL ARRANGEMENT OF REMOTE CONTROLLER

Figure 3:
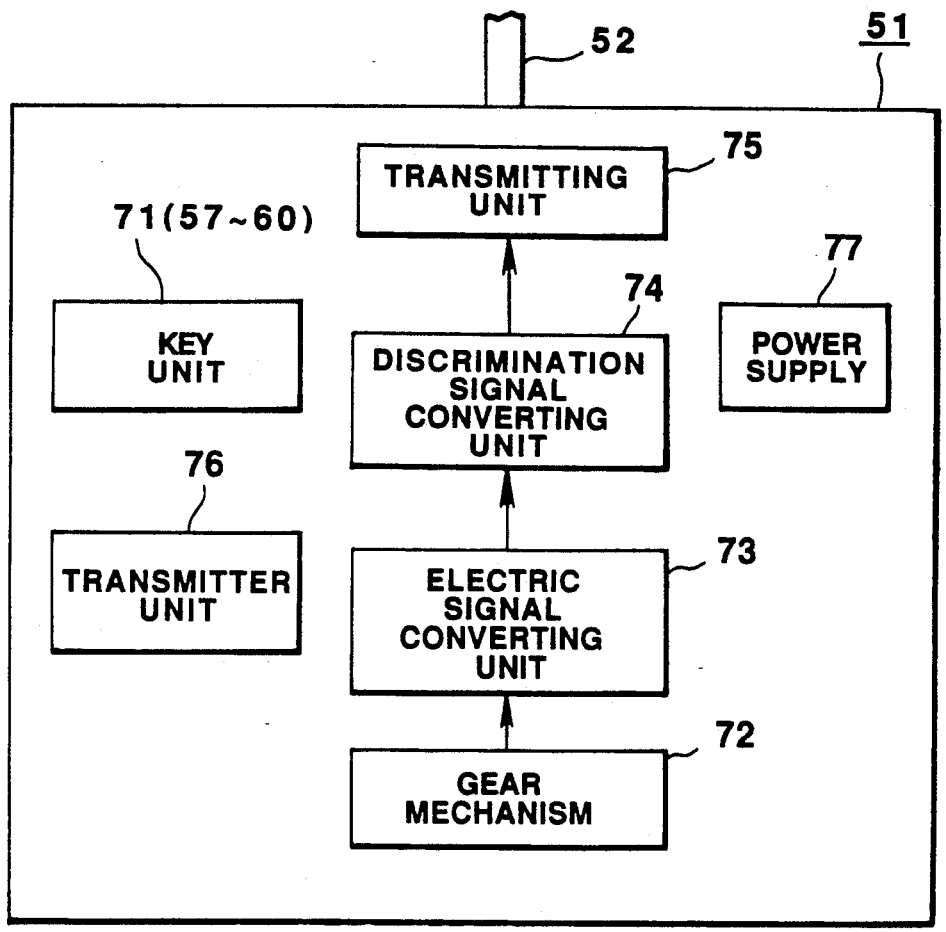
FIG. 3 schematically illustrates an electronic arrangement of the remote controller.

FIG. 3 represents an internal arrangement of the remote controller 51. In this figure, reference numeral 71 indicates a key unit arranged by the above-described tuning up/down key 57, sound volume up/down key 58, mode changing key 59 and function key 60. Key operation signals derived from the key unit 71 are supplied via the connection cable 52 to the control unit 19 provided at the main body 50 of the television apparatus.

Reference numeral 72 indicates a gear mechanism unit mechanically connected to the scanning roller 61. The rotations of the scanning roller 61 are transported via this gear mechanism unit 72 to an electric signal converting unit 73, and converted into a corresponding electric signal. This converted signal is thereafter sent to a discrimination signal converting unit 74. The discrimination signal converting unit 74 shapes the waveform of the input electric signal to obtain a pulse signal which will be outputted to a transmitting unit. In response to the pulse signal derived from the discrimination signal converting unit 74, the transmitting unit 75 supplies this pulse signal via the connection cable 52 to the control unit 19 provided at the main body 50 of the television apparatus.

Furthermore, reference numeral 76 indicates a transmitter unit which is operated in response to the operation condition of the FM transmitter selecting switch 62, and FM-modulates the sound signal sent via the connection cable 52 from the sound amplifying circuit 22. The FM-modulated sound signal is transmitted from this transmitter unit 76.

A power supply unit 77 supplies electric power to all of the above-described electronic circuits employed in the remote controller 51 and is operated by receiving electric power supplied from another power supply unit (not shown) of the main body 50 of the television apparatus via the connection cable 52.

MECHANISM OF REMOTE CONTROLLER

Figure 4:
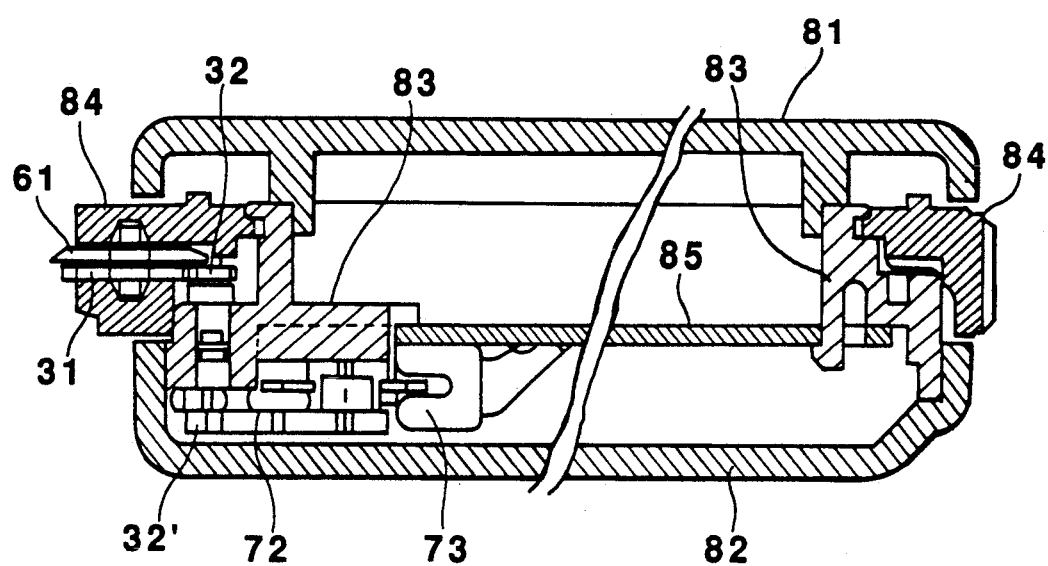
FIG. 4 is a sectional view of a mechanical arrangement of the remote controller.

FIG. 4 represents a sectional view of a structure of the remote controller 51. The remote controller 51 is so constructed that an upper case 81 on which the various keys 57 to 60 shown in FIG. 1B are mounted, and a lower case 83 on which the FM transmitter changing switch 62 shown in FIG. 1C is mounted, are fixed on a chassis 83 as a center. The rotating bezel 84 is provided between the peripheral portions of the respective upper and lower cases 81 and 82. This rotating bezel 84 is pivotably journaled with respect to the chassis 83, and the scanning roller 61 is provided on a portion thereof. The gear mechanism unit 72 is provided on the chassis 83 in such a manner that this gear mechanism unit 72 is connected with the scanning roller 61 under such a condition that this scanning roller 61 is pivoted to a predetermined position at a lower side of the remote controller 51 shown in FIG. 1B. Furthermore, the electric signal converting unit 73 and the circuit substrate 85 are provided on this chassis 83, and the rotations of the scanning roller 61 are converted into the electric signal by the electric signal converting unit 73 and the resultant electric signal is sent to the circuits (not shown) on the substrate 85.

Figure 5:
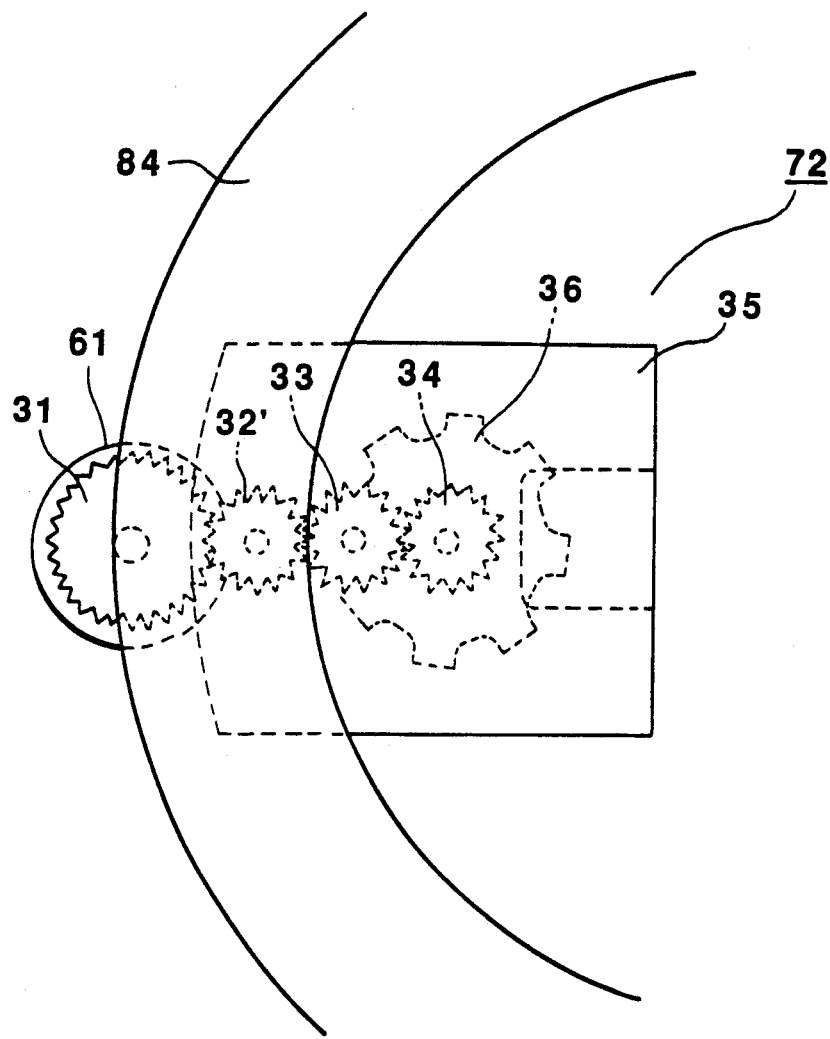
FIG. 5 represents a gear arrangement of the remote controller in detail.

FIG. 5 shows a more concrete structure of the scanning roller 61 and gear mechanism unit 72. That is, this figure represents such a state that the rotating bezel 84 is rotated so as to mesh the scanning roller 61 with the gear mechanism unit 72 positioned at a predetermined position. Also, a gear 31 coaxially constructed with the scanning roller 61 in one body, gears 32 and 32' coaxially mounted on a supporting member 35 of the gear mechanism unit 72 fixed on the chassis 83, and also two gears 32 to 34 are meshed with each other. Accordingly, the rotations of the scanning roller 61 are transferred via the gears 32, 33' and 33 of the gear mechanism unit 72 to the gear 34. Since a rotating slit plate 36 of the electric signal converting unit 73 is coaxially constructed with this gear 34 in one body, the rotating slit plate 36 is rotated in a reverse direction in accordance with the rotations of the scanning roller 61. A gear ratio of the scanning roller 61, gears 32 to 34 and rotating slit plate 36 is so designed that when, for instance, the scanning roller 61 is rotated by 1 mm, the rotating slip plate 36 is rotated by 45°. The rotating slit plate 36 is so formed that slits are formed at a proper interval along the entire outer peripheral portion of the disk, namely 8 slits are formed over the entire outer peripheral portion of the disk.

DETAILED ARRANGEMENTS OF ELECTRIC SIGNAL CONVERTING UNIT/DISCRIMINATION SIGNAL CONVERTING UNIT

FIGS. 6 and 7 represent a detailed or concrete structure of the electric signal converting unit 73. A fixing slit plate 37 is fixed with respect to the slit part of the rotating slit plate 36. On this fixing slit plate 37, two slits "A" and "B" are formed adjacent to each other along the circumferential direction of the fixing slit plate 37 at a smaller interval than the width of the respective slits formed on the rotating slit plate 36. As represented in FIG. 7, two phototransistors 38a and 38b are provided on the positions corresponding to the slit position at the side of the fixing slit plate 37, whereas LED 39 is provided at the side of the rotating slit plate 36.

With such an arrangement, light emitted from LED 39 is interruptedly incident upon these phototransistors 38a and 38b in accordance with the rotation of the rotating slit plate 36. By detecting the electric signals from the phototransistors 38a and 38b, both the rotating direction and rotation number of the fixing slit plate 37, namely the rotating direction and scanning distance of the scanning roller 61, can be detected.

For example, when the rotating slit plate 36 is rotated along a direction indicated as a "normal direction", since the slit of the rotating slit plate 36 passes through two slit positions in an order from "A" to "B", the waveform of the output signal from the phototransistor 38b is slightly delayed with respect to that from the phototransistor 38a. Also, since the rotating slit plate 36 is rotated by 45° while the scanning roller 61 is rotated by 1 mm, one time period of the signal waveform represents a distance of 1 mm.

Conversely, when the rotating slit plate 36 is rotating along a direction opposite to the above-described normal direction, i.e., reverse direction, since the slit of the rotating slit plate 36 passes through two slits of the fixing slit plate 37 in an order from "B" to "A", the waveform of the output signal from the phototransistor 38a is slightly delayed with respect to the waveform of the output signal from the phototransistor 38b, whereby 1 time period of the signal waveform indicates a distance of 1 mm.

FIG. 8 schematically represents circuit arrangements of the electric signal converting unit 73 and discrimination signal converting unit 74. A supply voltage "$V_{DD}$" is applied from the power supply unit 77 to one switching circuit 42 via LED 39 of the electric signal converting unit 73, the phototransistors 38a and 38b, and also to the other switching circuit 43 via this first switching circuit 42. These switching circuits 42 and 43 belong to the discrimination signal converting circuit 74. Since these LED 39, phototransistors 38a, 38b and switching circuits 42, 43 are connected a grounded regular circuit 41, the supply voltage $V_{DD}$ is adjusted. The detection signal from the phototransistor 38a is inputted to the switching circuit 42 and the detection signal from the phototransistor 38b is inputted to the switching circuit 43 so that these detection signals are waveform-shaped.

MEMORY MAP OF EEPROM

A memory map of EEPROM. 25 is represented in FIG. 9. EEPROM 25 comprises of register groups required to perform the above-described specific operations.

Registers R1 to R3 are employed to adjust the television apparatus. That is, the register R1 stores therein a channel number, the register R2 stores therein a sound volume value, and the register R3 stores therein a brightness value.

The functions of registers R4a to R4e are to preset scale values of a map. 4 scale values are stored in the registers R4a and R4e and data representing which register has been selected is held in the register R4e.

A register R6 holds length data which has been calculated in the "measurement" mode, and a register R5 holds distance data obtained by multiplying the scale values stored in the registers R4a and R4e by the length data stored in the register R6 in the "map" mode.

A register R7 holds time data elapsed from the starting time in a unit of "minute" in the "navigation" mode, while counting up. Registers R8a to R8c store remaining time data of a page under execution, present velocity data, and remaining distance data.

Registers R9a, R10a, R11a store schedule time data, schedule velocity data and schedule distance data which are inputted when the first page is scheduled, whereas registers R9b, R10b, R11b, R9c, R10c and R11c store therein the similar data to the above-described various data used for the second page and the third page.

Registers R12a, R13a hold resultant time data and resultant velocity data at a time instance when an automobile arrive at a destination place of the first page. Registers R12b, R13b, R12c and R13c hold similar data to that used for the second page and third page.

A register R14a stores initial value data on time elapse (the time elapse starts from "0" in the first page, but commences from the continuations of the previous page with respect to the second page and third page), and a register R14b stores the time elapse data which has been corrected in the correction mode.

A register R15a stores distance meter value data on an automobile when it starts; a register R15b stores distance meter value data which has been corrected in the correction mode; and a register R15c stores present distance meter value of this television apparatus, which is counted up from an initial meter value.

A register R16a stores a present page number among the first, second and third pages, whereas a register R16b stores data indicative of the mode under execution.

MAJOR OPERATION

Figure 10:
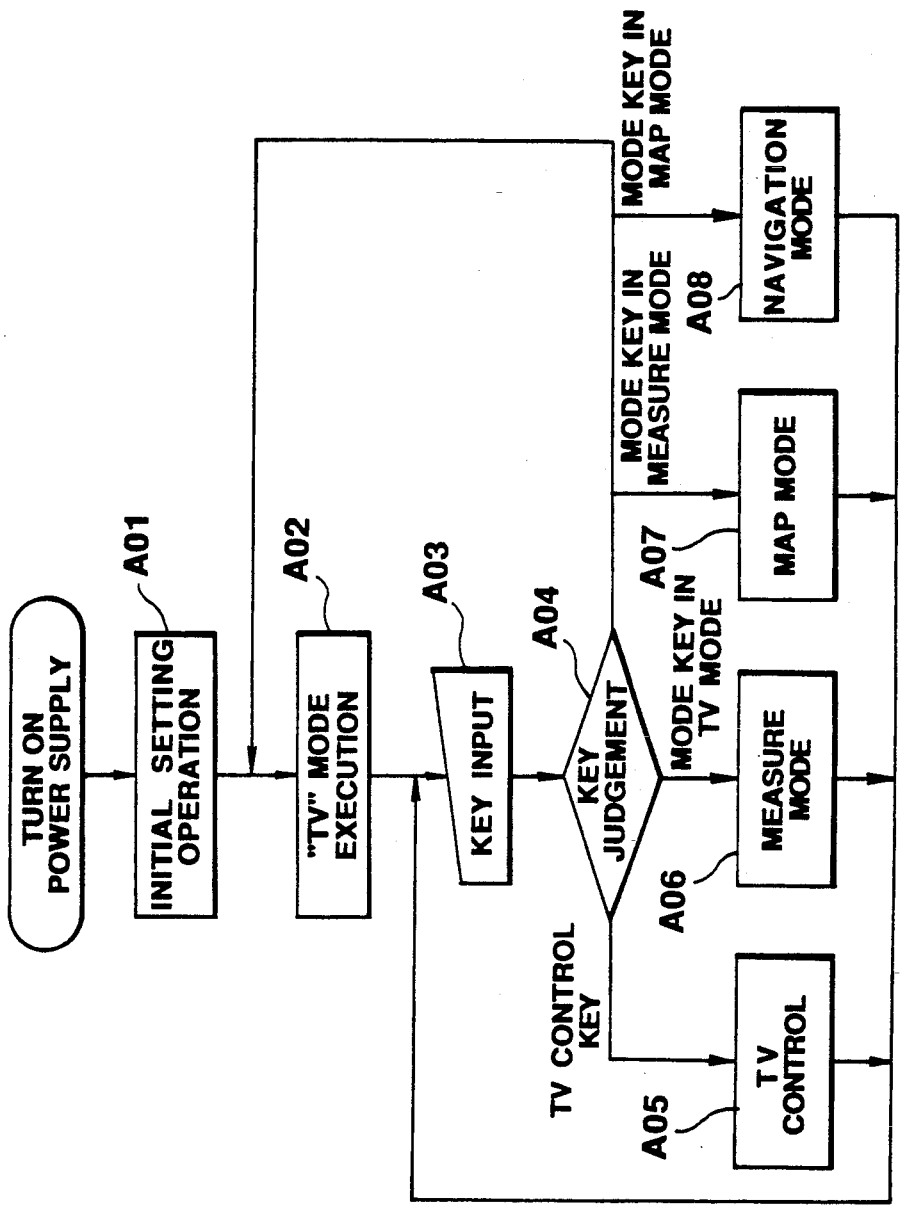
FIG. 10 is a flow chart for explaining an overall operation process of the image display apparatus shown in FIG. 1A.

FIG. 10 is a flow chart for representing a major operation of an overall operation for the television apparatus, and operation controls (and calculations) mainly performed by the control unit 19. In this main operation, when the power supply is turned ON and the operation starts, an initial setting operation of the television apparatus is performed at a step A01.

Figure 11:
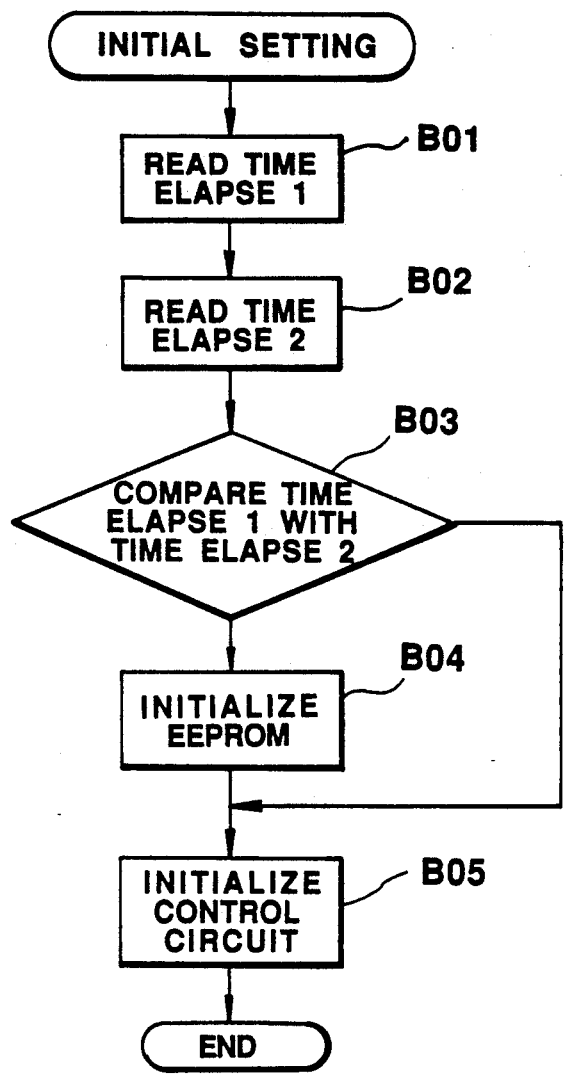
FIG. 11 is a flow chart for explaining an operation process of the image display apparatus during an initial setting operation.

FIG. 11 represents a process content of this initial setting operation. At a first step B01, the time elapse time data stored in the register R7 of the EEPROM 25 is read out. Subsequently, the second time elapse data stored in the register R17 is read out at a step B02 and then a comparison is made whether or not the first time elapse data is coincident with the second time elapse data at a next step B03. When it is judged that the first time elapse data is coincident with the second time elapse data, it may be regarded that the necessary data held in EEPROM 25 are correct, and thereafter, other control circuits are initialized at a step B05, whereby this initial setting process is accomplished.

To the contrary, in case that it is so judged that the first time elapse data is not coincident with the second time elapse data, it may be regarded that the necessary data which have been held in EEPROM 25 are not correctly written and the reliabilities thereof are lowered. At the next step B04, after all of the register groups employed in this EEPROM 25 are initialized, other control circuits are initialized and then this initial setting operation process is ended.

When the initial setting operation is accomplished, in the main operation shown in FIG. 10, "1" indicative of the "television" mode is held in the register R16b of the EEPROM 25 at a next step A02, and the main process is advanced to the "television" mode, i.e., the basic mode. Thereafter, the main process waits for the operation of the keys 24 for the main body provided at the side of the television body 50, or the operation of any key in the key unit 71 provided at the side of the remote controller 51. When the key input operation is performed, a judgement is made at a next step A04 which key is operated.

If a judgement result is made such that the key operation to control the television apparatus effected by the key inputs corresponds to any one of the tuning up key 54, tuning down key 55, sound volume adjusting key, brightness adjusting key, which are provided at the main body 50 of the television apparatus, and also the tuning up key 57, sound volume up/down key 58 which are provided at the side of the remote controller 51, the process is advanced to a next step A05 at which the contents of the registers R1 to R3 of EEPROM 25 are rewritten in response to the key inputs. After the television apparatus has been newly controlled in accordance with the rewritten contents, the process is returned to the previous step A03 so as to wait for another key input. When, for instance, the tuning up key 54 and tuning down key 55 are operated, the control unit 19 searches the AFT signal to newly perform a tuning operation.

To the contrary, if a judgement result is made that the key input is executed not by the key operation to control the television apparatus, but by the mode changing key 59 in the "television" mode, since this mode changing key 59 is to instruct the mode changing operation from the "television" mode into the "measurement" mode, the content of the register R16b employed in EEPROM 25 is rewritten by substitute "1" indicative of the "television" mode by "2" representative of the "measurement" mode. Thereafter, the process is advanced to a step A06 at which the process operation in the "measurement" mode is commenced, a detailed description of which will be made later.

Similarly, when another judgement result is made that the key input effected at the step A04 corresponds to the key operation by the mode changing key 59 in the "measurement" mode, after the content of the register R16b of the EEPROM 25 has been rewritten by substituting "2" representative of the "measurement" mode by "3" indicative of the "map" mode, the process is advanced to a further step A07 at which the process operation in this map mode is carried out (will be discussed in detail).

Also, if another judgement result is established at the step A04 such that the key input corresponds to the key operation by the mode changing key 59 in the "map" mode, the present content of this register R16b is rewritten by 4 indicative of the "navigation" mode and thereafter the process is advanced to a step A08, at which the process operation of the "navigation" mode is executed (will be described in detail).

Moreover, when it is so judged that the key input at the step A04 corresponds to the key operation of the mode changing key 59 in the "navigation" mode, after the content of the register R16b is rewritten by "1" indicating the "television" mode, the process operation of the television mode is again performed at the previous step A02.

After the process operation defined at the steps A06 to A08 performed at the respective modes has been once accomplished, the process operation is returned to the step A03 at which a further key input is awaited and thereafter the similar operations as described above will be repeated.

A detailed process operation effected in each of the above-described "measurement" mode, "map" mode, and "navigation" mode will now be described.

MEASUREMENT MODE

First, the process operation performed at the "measurement" mode will now be described more in detail.

Figure 12:
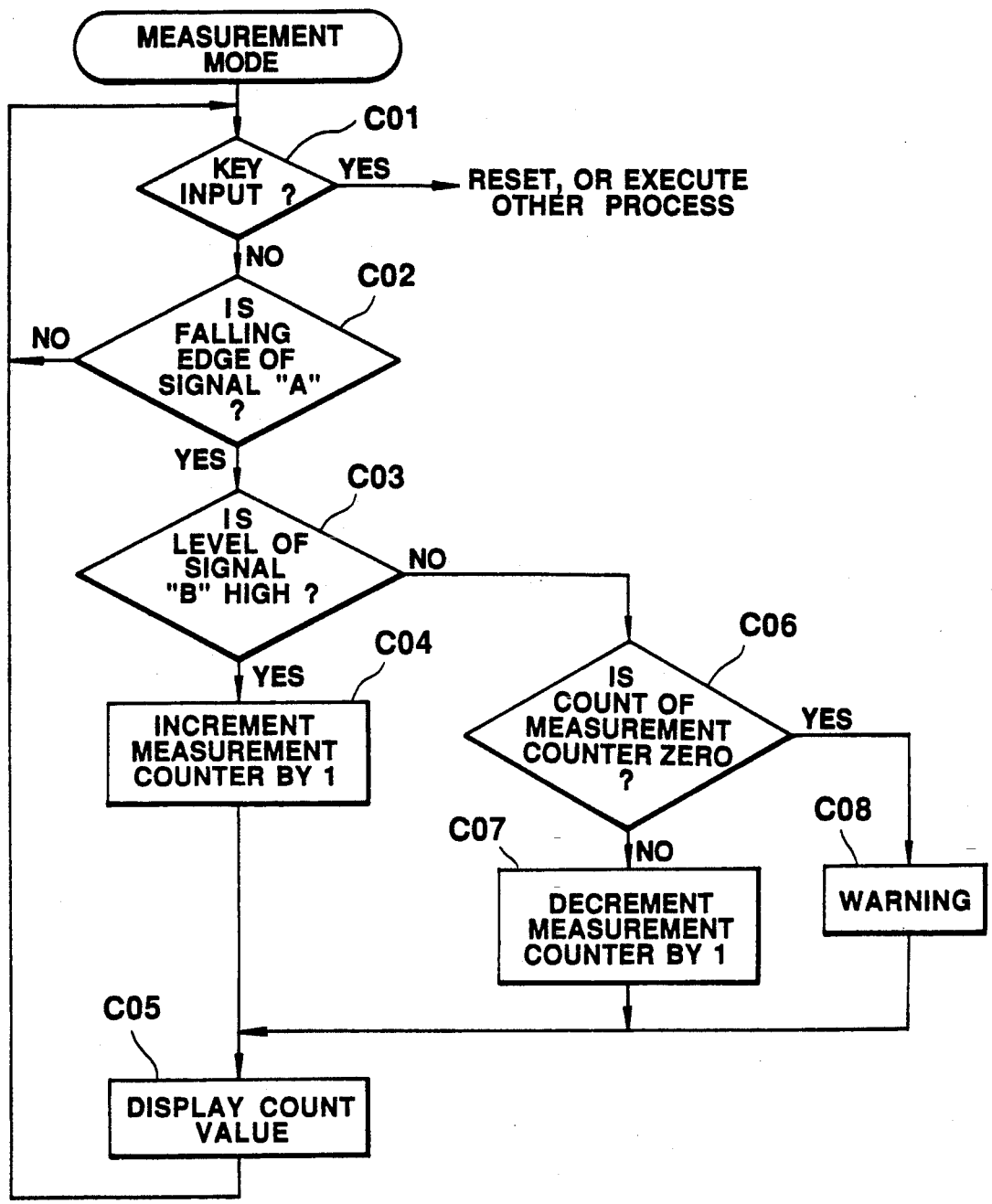
FIG. 12 is a flow chart for representing an operation process of the image display apparatus in a measuring mode.

FIG. 12 is a flow chart for representing a content of the process operation during the "measurement" mode. In this flow chart, a check is made at a step C01 whether or not a key input is done. In case that the key input is made, the register R6 of EEPROM 25 is reset in accordance with the content of this key input and another process operation is performed. Conversely, if a judgement result is made that no key input is done, the process is advanced to a next step C02. At this step C02, another check is performed whether or not a falling edge of the output signal "A" shown in FIG. 8 is detected from the transmitting unit 75 in response to the rotations of the scanning roller 61 employed in the remote controller 51.

Figure 13A:
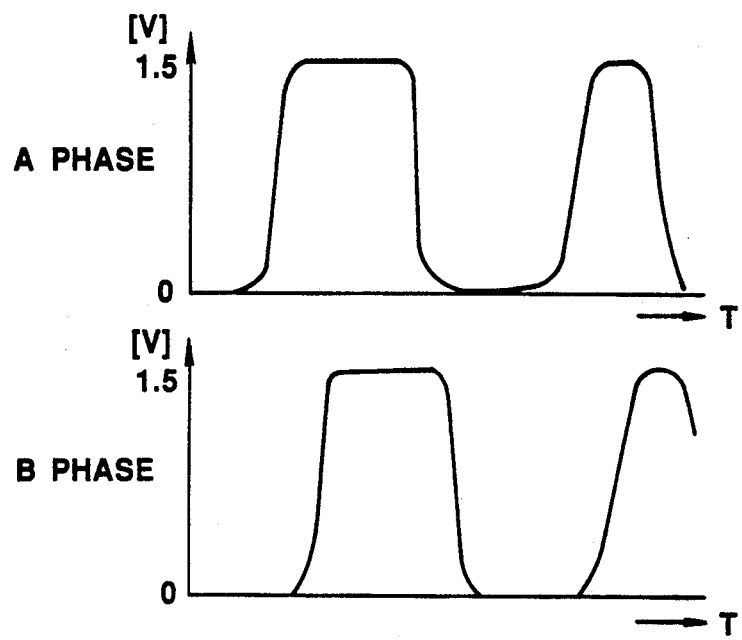
FIG. 13A shows signal waveforms outputted from the respective phototransistors in response to rotations of a scanning roller.

FIG. 13A represents waveforms of output signals derived from the phototransistors 38a and 38b while the rotating slit plate 36 of the electric signal converting unit 73 is rotated in accordance with the rotations of the scanning roller 61. In this case, as shown in FIG. 13A, the waveform of the signal B outputted from the phototransistor 38b is delayed with respect to that of the signal A outputted from the phototransistor 38a.

Figure 13B:
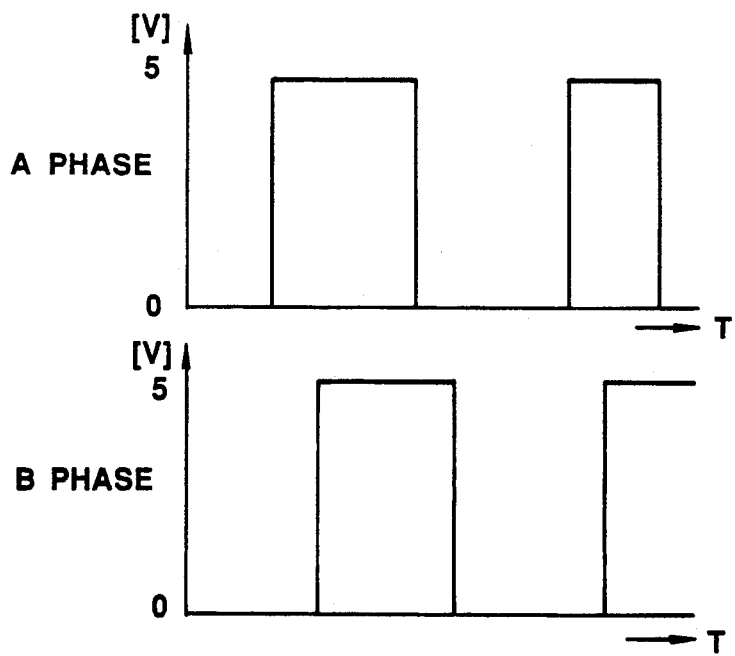
FIG. 13B shows signal waveforms which are obtained by shaping the signal waveforms shown in FIG. 13A.

Thus, waveforms of the signals derived from the phototransistors 38a and 38b are shaped in the switching circuits 42 and 43, so that the shaped waveforms are obtained as shown in FIG. 13B. These shaped signals are supplied via the connection cable 52 from the remote controller 51 by the electric signal converting unit 73 to the control unit 19 employed in the main body 50 of the television receiver so as to judge the levels and falling timings thereof.

Then, when the falling portion of the output signal "A" is not detected at the step C02, this implies that the scanning roller 61 is not rotated, and thus no "measurement" operation is performed. As a consequence, the process operations as defined in the above-described steps C01 and C02 are repeated until the falling edge is detected.

Upon detection of the falling edge of the output signal A, the process is advanced to a next step C02 at which a check is made whether or not the level of the other output signal B is "H". This judgement is required to detect the rotating directions of the rotating slit plate 36 and scanning roller 61. If the level of this output signal B becomes "H" as represented by a state "1" of FIG. 14, then these members are rotated in the normal rotation direction. Thereafter, the process is advanced to a further step C03 at which the content of the register R6 in the EEPROM 25, that is used as a "measurement counter", is incremented by 1. The count value of this register R6 is directly proportional to the distance measured while the scanning roller 61 is scanned. The count value of "1" corresponds to 1 mm in this embodiment.

Figure 14:
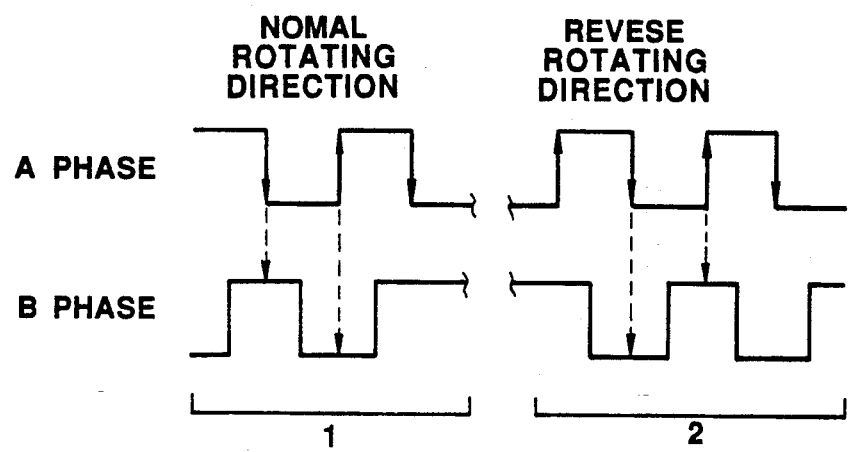
FIG. 14 shows waveforms for representing differences in the waveforms when the scanning roller is rotated in the normal direction and reverse direction.

When another judgement result is made at the step C03 that the level of the other output signal B is an "L" level at a time instance when the edge of the output signal A is fallen, as shown in a state "2" of FIG. 14, it can be judged that both the rotating slit plate 36 and the scanning roller 61 are rotated in another direction opposite to the above rotating direction, namely a reverse direction. Then, the process is advanced to a next step C05 at which a check is made whether or not the content of the register R6 functioning as the measurement counter is equal to zero. If this content is not equal to zero, then the content of the register R6 at a step C07 is decremented by 1.

To the contrary, when it is so judged that the content of the register R6 is equal to zero at the step C06, since no further count decrement operation is carried out, a warning sound is reproduced from the speaker 23 at a step C08.

When the content of the register R6 has been updated at the steps C04 and C07, or the reproduction of the warning sound has been accomplished at the step C08, the content of the register R6 at the step C05 is read out and processed as the display data which will be then sent to the display control circuit 16, whereby this content of the register R6 is displayed on the display unit 53. Thereafter, the process is returned to the previous step C01 so that a series of the above-described process operations is repeated.

MAP MODE

A detailed process operation in the "map" mode will now be described.

Figure 15:
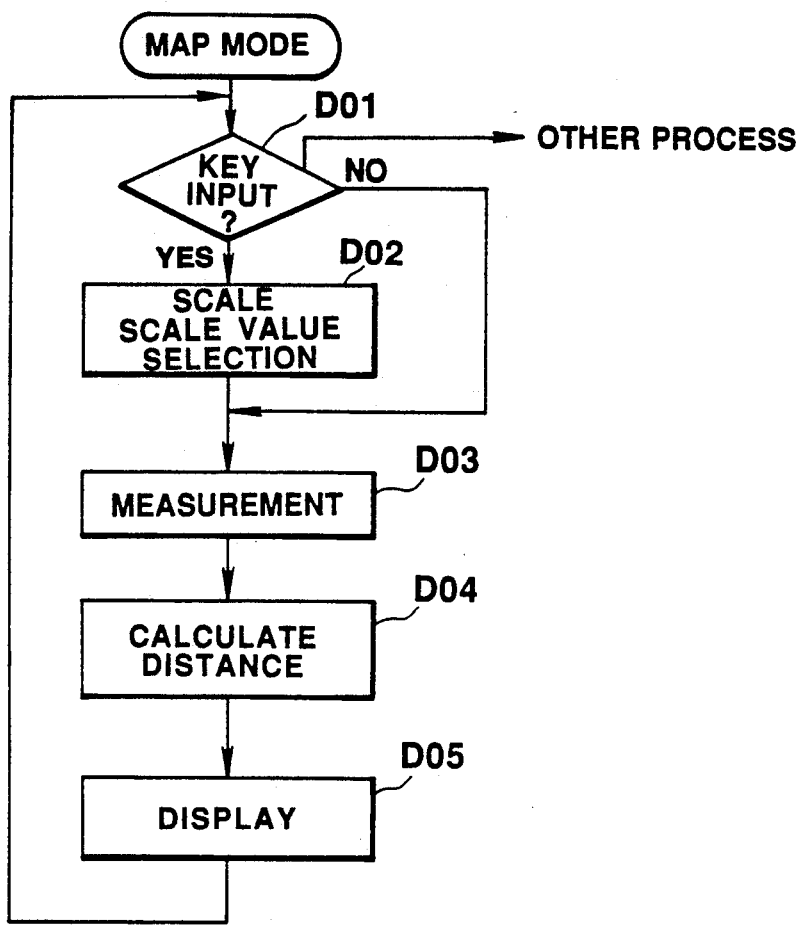
FIG. 15 is a flow chart for showing an operation process of the image display apparatus in a map mode.

FIG. 15 is a flow chart for showing a process content performed in the "map" mode. At a first step D01 of this flow chart, a check is made whether or not a key input is performed. This key input judgement is required so as to judge whether or not a selection is made of the scale values (i.e., scale reduction information) for four maps which have been previously stored in the registers R4a to R4d employed in EEPROM 25. The selection of the scale values is performed by operating, for instance, the "1" key of the function key 60.

If the "1" key of the function key 60 is operated, then it is so judged that the key input is made and thus the process is advanced to a next step D02, at which a process of the scale selection for the map is carried out. This scale selection is performed by judging a total number of key operations of the function key 60 in such a manner that the content of the register R4e is successively incremented within a range from "1" to "4" in response to this key operation time. That is, the content of the register R4e is set to "1" by operating this key one time, so that the scale value held in the register R4a is selected. Similarly, the content of this register R4e is set to "2" by operating the key twice, whereby the scale value stored in the register R4b is selected. Also, when the key is operated three and four times, the content of this register R4d becomes "3" and "4", so that the scale values stored in the registers R4c and R4d are selected. Then, when the "1" key of the function key 60 is operated 5 times, the content of the register R4e is again set to "1" and therefore the scale value stored in the register R4a is selected.

To the contrary, in case that a judgement result is made of no key input at the previous step D01, assuming that any of the content values "1" to "4" has been held in the register R4e and the scale value selection has been completed, the process operation as defined at the step D02 is omitted.

Upon completion of this scale value selection, the actual measurement operation is performed at a next step D03. This actual measurement operation is performed in a similar manner to the operation of the "measurement" mode which is carried out at an arbitrary position on a map, for instance, a road. That is, the road on the map is scanned by the scanning roller 61, and then the resultant length data is stored in the register R6 of EEPROM 25.

When the actual measurement is carried out and the length data is inputted in the register R6, a distance calculation is executed at a subsequent step D04. This distance calculation is executed as follows: the scale value stored in any one of the registers R4a to R4d, which is designated by the content of the register R4e, is multiplied by the scanned distance stored in the register R6. Upon completion of this distance calculation, the process is advanced to a step D05 at which this calculation result (distance data) is stored in the register R5 and also is supplied to the display drive circuit 16 so as to be displayed on the display unit 53.

Thereafter, the process is returned to the first step D01 at which the similar operation will now be repeated, whereby the distance data which has been calculated from the actually measured length are displayed (i.e., the real distance is displayed); in real time mode on the display unit 53 in response to the scanning operation of the scanning roller 61.

It should be noted that if another judgement result is made that the key input other than the above-described "1" key of the function key 60 at the first step D01, the measurement value is reset and the processes of other mode selections will be performed in accordance with this key input.

NAVIGATION MODE

A detailed process operation of the "navigation" mode will now be described.

Figure 16:
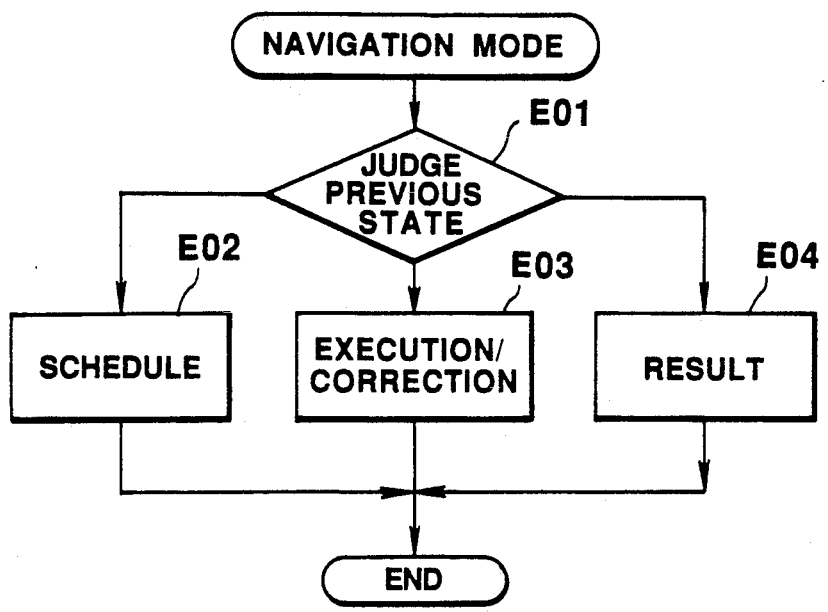
FIG. 16 is a flow chart showing an operation process of the image display apparatus in a navigation mode.

FIG. 16 is a flow chart for explaining a content of an overall process operation effected in the "navigation" mode. The operations executed in the navigation mode are performed with respect to a single drive operation. This navigation mode includes four modes, i.e., "schedule", "execution", "correction" and "result" modes. The "correction" mode is to properly correct various data during the execution in the "execution mode". It should be noted that since there are some possibilities such that a car driver stops his car to have a rest and turns off the power source of the image display apparatus during the drive operation, the latest mode data when the power source is turned off are stored in the register 16b employed in EEPROM 25 and the subsequent mode operation should be determined based on the content of this register R16b. In this case, the memory contents of the register R16b are as follows, for instance; "4-1" for the "schedule" mode; "4-2" for the "execution/correction" mode, and "4-3" for the "result" mode.

As shown in FIG. 16, when the "navigation" mode is commenced, a judgement is made at a first step E01 about the previous state, depending upon the content of the register R16b of EEPROM 25. Then, if the content of this register R16b is "4-1", then the operation mode corresponds to the "schedule" mode. If the content of this register R16b is "4-2", the operation mode corresponds to the "execution/correction" mode. If the content of the register R16b is "4-3", then the operation mode corresponds to the "result" mode.

It should be noted that although not shown in detail, the mode designation may be compulsorily achieved by way of the key operation.

SCHEDULE IN NAVIGATION MODE

Figure 17:
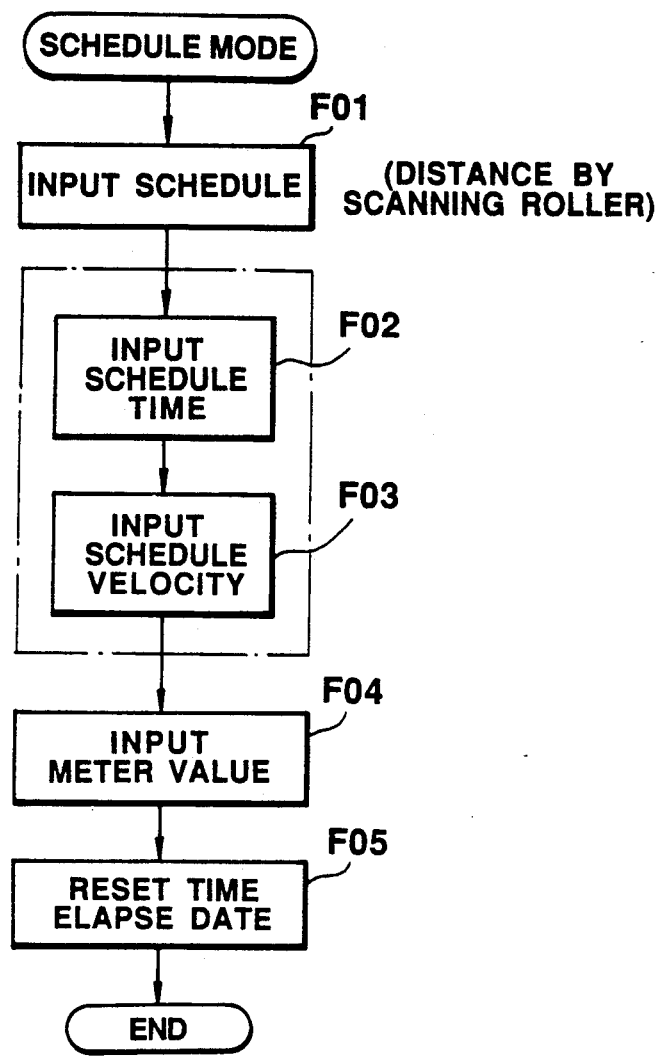
FIG. 17 is a flow chart for showing an operation process of the image display apparatus in a schedule mode.

FIG. 17 is a flow chart for explaining a process content effected in the "schedule" mode. At a first stage of this process operation, the setting conditions of the various sorts of data are designated by operating the key "2" of the function key 60 in accordance with the display contents on the display unit 53. Thereafter, a scheduled distance is inputted at a step F01. This distance input operation is performed by scanning roads shown in a way by utilizing the scanning roller 61 in a similar manner to that of the above-described "map" mode. Since a detailed operation of this distance input operation is similar to that shown in FIG. 15, a further explanation is omitted. The scheduled distance data which have been inputted in accordance with the above-explained manner are displayed on the display unit 53, and are transferred from the register R5 to the register R11a.

Upon completion of the distance data input, the schedule time is inputted at a step F02 and the schedule velocity is inputted at a step F03. When one of the schedule time data and schedule velocity data is entered, the other data is calculated based upon the scheduled distance data inputted at the previous step F01, and therefore may be automatically set. The entered scheduled time data is stored in the register R9a and the schedule velocity data is stored in the register R10a.

Thereafter, values of either an odometer or a trip meter mounted on an automobile is inputted at a step F04. In this case, a numeral value "00000.0" is displayed by which a display of a meter value is requested for a car driver. A cursor is flickered at a top-digit position of this request display. The meter values are entered in such a manner that the numeral values are inputted in a unit of digits indicated by the cursor and the cursor is successively moved toward the last digit of this numeral representation. The meter value inputted in such a manner is stored in the register R15a as an initial meter value.

When the meter values have been entered, the time elapse data which have been held in the register R7 and R17 at the step F05 are cleared as "0" and thus the overall process of this "schedule" mode is ended.

It should be understood that the above-explained process of this schedule "mode" relates to a first page and the content of the register R16a becomes "1" in this case. As previously stated, since the image display apparatus can set three pages, the contents of the register R16a are updated when the second page and third page are set. Also, the operations similar to the above-described process operations are repeatedly performed.

Upon completion of the "schedule" mode, the key "1" of the function key 60 is operated in accordance with the display content of the display unit 53. Then, when an instruction is made to start the schedule, the present memory content "4-1" of the register R16b is rewritten by "4-2", whereby the "schedule" mode is changed into the "execution/connection" mode.

EXECUTION IN NAVIGATION MODE

Figure 18:
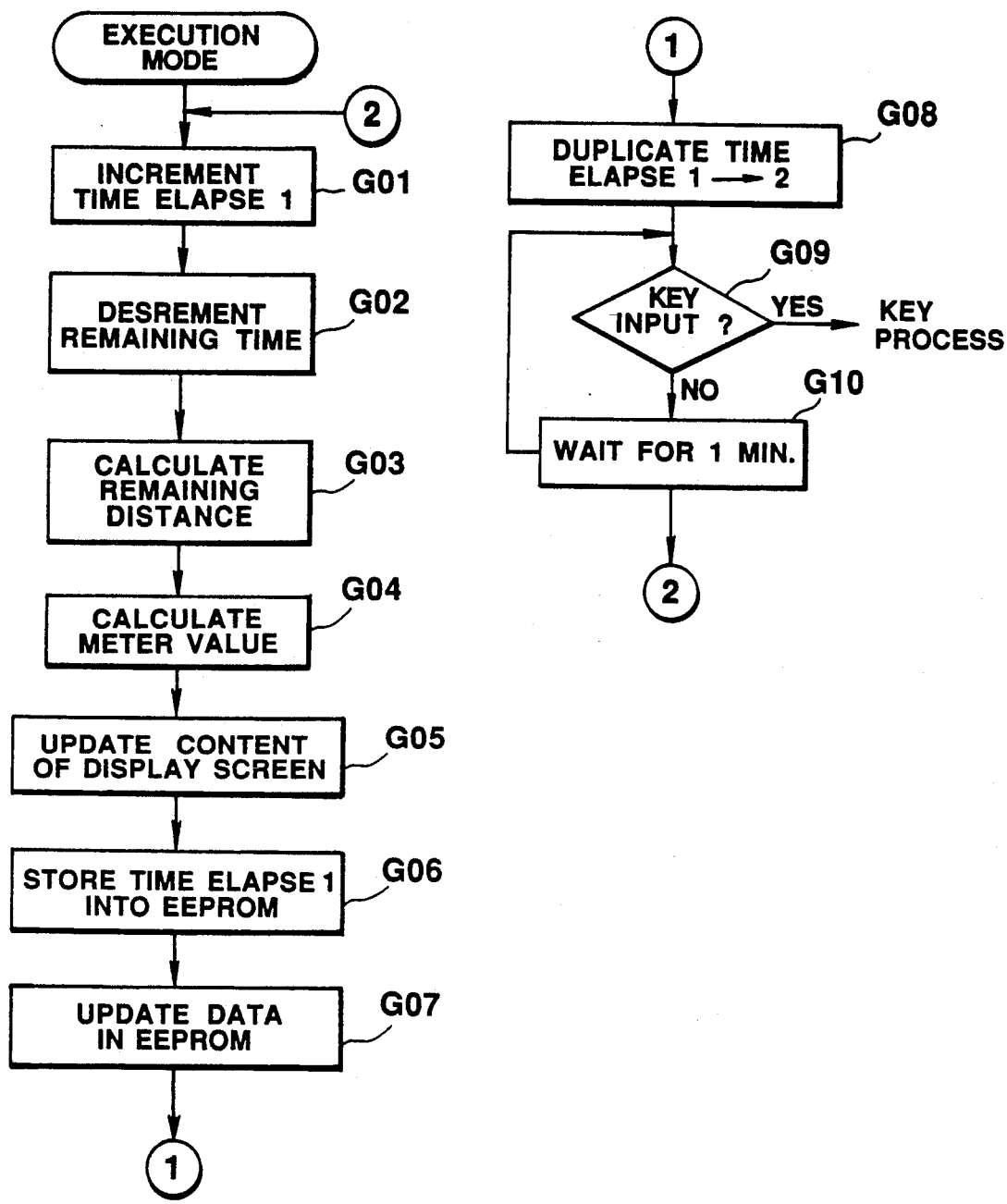
FIG. 18 is a flow chart for explaining an operation process of the image display apparatus in an execution mode.

FIG. 18 is a flow chart for explaining a content of the process operation performed during the "execution" mode. At the first stage of this execution mode, after the scheduled time data on the first page stored in the register R9a is transferred to the register R8a so as to be stored as the remaining time data, and also the scheduled velocity data stored in the register R10a is transferred to the register R8b so as to be stored as the present velocity data, the time elapse data held at the register R7 is incremented at a first step G01 and temporarily stored in an internal memory of the control unit 19. This register R7 is employed so as to hold the time elapse data every minute. As a result, after the content of this register R7 is incremented, the present time elapse data is increased by 1 minute, as compared with the last time elapse data.

Subsequently, at a next step G02, the remaining time data on the page under execution held in the register R8a in response to increment of the time elapse, namely the remaining time data on the first page is decremented, and is temporarily stored in the internal memory of the control unit 19.

Thereafter, the remaining distance is calculated at a step G03. This remaining distance is so calculated by multiplying the remaining time data calculated at the step G02 with the present velocity data stored in the register R8b. The resultant distance data is temporarily stored in the internal memory of the control unit 19.

Next, at a step G04, the present meter value "$M_p$" is calculated based upon the remaining distance data which has been calculated at the step G03. The present meter value will be calculated by the following formula (1) based on the initial value data stored in the register R15a, the scheduled distance data stored in the register R11a and the remaining distance data held in the internal memory of the control unit 19:

$$M_p = M_i + (D_S - D_R) \quad (1),$$

where symbol "$M_i$" indicates the initial value, symbol "$D_S$" denotes the scheduled distance and symbol "$D_R$" indicates the remaining distance. The calculated present meter value "$M_p$" is temporarily stored in the internal memory of the control unit 19.

The update operations of the various data stored in EEPROM 25 are accomplished at the previous steps G01 to G04. At a subsequent step G05, the updated new data are sent to the display drive circuit 16 and displayed at the display unit 53. Thereafter, the time elapse data is newly updated and set to the register R7 of EEPROM 25 at a step G06, and then the remaining time data, remaining distance data and meter present value data which have been temporarily stored inside the control unit 19 at a step G07 are updated and stored into the register R8a, register R8c and register R15c, respectively.

At a next step G08, the above-described time elapse data which have been stored into the internal memory of the control unit 19 is set to the register R17 of EEPROM 25.

A check is made whether or not the key input is made at the subsequent step G09. If no key input is made, then the process is advanced to a step G10 at which the process operations as defined at the steps G09 and G10 are repeated until it is judged that 1 minute has elapsed. When a judgement result is made that 1 minute has passed, the process operations as defined from the first step G01 will be again executed.

As previously explained the process operations as defined from the step G01 to the step G10 are repeatedly executed every time 1 minute has passed, so that the respective data stored in EEPROM 25 are sequentially updated. Furthermore, as previously stated, the time elapse data held inside the control unit 19 is set to the register R7 at the step G06 and is set to the register R17 at the step G08. This is because a detection can be made that the stored data are destroyed due to such an accident that a lengthy time period is required to write the data and the power source is turned off during this long writing time period. In other words, the data update operation of EEPROM 25 is performed one time every 1 minute, which requires about 0.3 seconds. If the power sources for the automobile and display apparatus are accidentally turned off during this time period, 0.3 seconds, a data writing error happens to occur and thus there are some possibilities that the data are destroyed. To avoid such a trouble, the time elapse data which has been stored in the internal memory of the control unit 19, is previously written into the register R7 before updating the data, and the time elapse data which has been stored in the internal memory of the control unit 19 is similarly written into the register R17 after the data has been updated. In case that both the power sources of the automobile and the display apparatus are turned off, as shown in FIG. 11, a comparison is made between the data stored in the register R17 and the data stored in the register R7 at a time instant when the power sources are turned on. If both of these data are coincident with each other, the data destroy never happens to occur, whereby the operation is continued with employment of the respective data whose reliabilities are highest. Conversely, if these data are not coincident with each other, as previously described, data destruction occurs. Thus, all of these data are initialized because the reliabilities of these data held in EEPROM 25 are lowered.

In case that the key input is made at the step G09, the process operation corresponding to this key input is performed. For instance, when the key "1" of the function key 60 is manipulated, namely a temporary step is instructed, and also the key "2" thereof is operated under this temporary stop condition, namely a "correction" operation is instructed, the process is advanced to the "correction" mode.

CORRECTION IN NAVIGATION MODE

Figure 19:
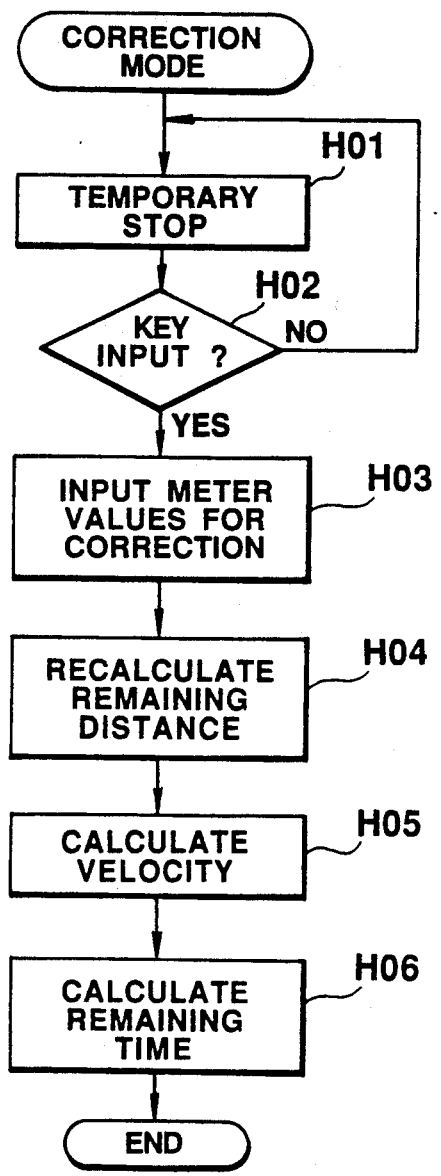
FIG. 19 is a flow chart for explaining an operation process of the image display apparatus in a correction mode and, FIG. 20 is a flow chart for explaining an operation process of the image display apparatus in a result display mode.

The "correction" mode in the navigation mode performs such process operation, as shown in FIG. 19, either when there is a great difference between the respective data displayed on the display unit 53 based upon the data scheduled during the "schedule" mode and the real data, or when the schedule is changed midway.

The process operation shown in FIG. 19 is executed as a subroutine of the flow operation shown in FIG. 18. At the beginning of the process operation, the instruction of the temporary stop is received at a step H01. Thereafter, a check is made whether or not the key input is made at a step H02. Until the key input is made, the process operations as defined at the steps H01 and H02 are repeated. After the key input by the key "2" of the function key 60 for instructing the "correction" has been made, the process is advanced to a further step H03. At this step H03, the meter value for the correction purpose is entered in a similar manner to that performed in the "schedule" mode. In this case, the numeral values shown in the display unit 53 are not "00000.0" as in the "schedule" mode, but are as follows. That is, the present meter values held in the register R15c are utilized and a cursor to request an input to be entered at the last digit of this present meter values is flickered. Accordingly, a user enters the numeral values in unit of digits displayed at the cursor based upon the odometer value of the automobile, and moves the cursor along the top direction. By repeating both the numeral value entry and the cursor movement, the odometer values for correction purposes may be inputted and then are stored in the register R15b.

Upon completion of entries of the odometer numeral values for correction purposes, the remaining distance data "$D_R$" is again calculated at a step H04 in accordance with these entered numeral values. This calculation is realized by the following formula (2):

$$D_R = D_S - (N_C - N_I) \qquad (2),$$

where symbol "$D_S$" indicates scheduled distance data held in the register R11a; symbol "N" denotes data on the odometer correction values held in the register R15b, and symbol "$N_I$" represents data on the initial values of the odometer. The calculated remaining distance data is automatically set to the register R8c. Subsequently, actual velocity data from the commencement at the step H05 until the "correction" mode is instructed is calculated. The calculation for the actual velocity data is so performed by subtracting the initial value of the time elapse data stored in the register R14a from the time elapse data stored in the register R7, whereby data on the correction values of the time elapse is calculated. Subsequently, the actual drive distance is subtracted by this time elapse correction data, namely a difference between the odometer correction data and the odometer initial data. It should be noted that this time elapse initial value is commenced from "0" at the first page, but is continued from the previous page at the second and third pages. The calculated actual drive velocity data is automatically set into the register R8b.

Thereafter, the remaining time is calculated at a step H06. This calculation is executed by subtracting the actual drive velocity data calculated at the step H05 from the remaining distance data calculated at the step H04. The calculated time data is automatically set into the register R8a.

When the distance data, actual drive velocity data and remaining time data have been automatically set by entering the odometer values for correction purposes, the process operations in the "correction" mode have been accomplished. Then, the process operation is again returned to the temporary stop condition in the "execution" mode shown in FIG. 18.

RESULT IN NAVIGATION MODE

When an instruction is issued to accomplish the "execution" mode of the first page, the process is advanced to the "result" mode in order to display the result obtained in the "execution" mode.

Figure 20:
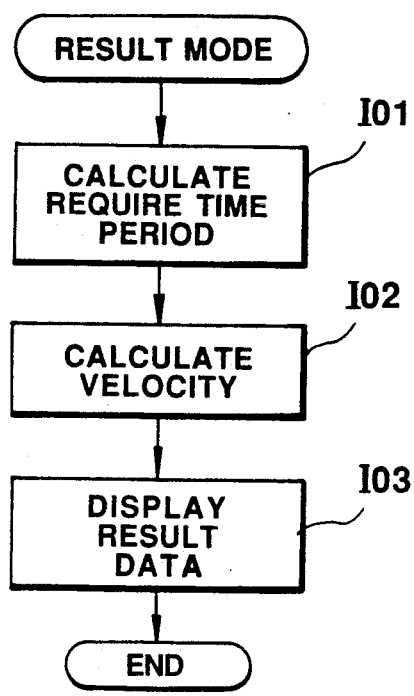

FIG. 20 is a flow chart for explaining a content of process operations in the "result" mode. At the beginning of the process operations, a required time period is calculated at a step I01. This calculation is performed by subtracting the initial value of the time elapse stored in the register R14a from the time elapse data stored in the register R7. Thus, the calculated required time period data is set into the register R12a as resultant time data.

Thereafter, the velocity calculation during the actual drive operation is executed at a step I02. This calculation is achieved by subtracting the scheduled distance data stored in the register R11a by the above-calculated required time data. The calculated velocity data is set as resultant velocity data into the register R13a.

At the subsequent step I03 both the required time data obtained by the calculations at the steps I01 and I02, and the velocity data are supplied to the display drive circuit 16, and displayed at the display unit 53, whereby the process operations in the "result" mode are completed.

In case that the process is advanced to the "execution" modes for the third page and second page after the process operations until a series of "result" modes related to the first page has been completed, for instance, the "execution" mode may be carried out by operating the key "3" of the function key 60. In this case, the time elapse data stored in the register R7 and obtained at the end of the previous page are newly set as the initial time elapse data into the register R14a.

The above-described operations are repeatedly performed also in the "execution (/correction) mode and the "result" mode for the second page and third page.

What is claimed is:

1. A display apparatus for processing distance information, comprising:

an apparatus body;

a measurement unit, provided separately from said apparatus body, said measurement unit including distance measurement means for measuring a scaled distance on a map;

input means for inputting scale reduction information of the map and time information;

calculation means, provided in said apparatus body, for calculating a real distance from the scaled distance measured by said distance measurement means and the scale reduction information inputted by said input means, and for calculating velocity data from the calculated real distance and the time information inputted by said input means; and display means, provided on said apparatus body, for displaying the velocity data calculated by said calculation means; and television circuit means for displaying a television image on said display means, and tuning control means, included in said television circuit means, for controlling an operation of said television circuit means;

and wherein said calculation means is included in said tuning control means of said television circuit means, 2. The display apparatus for processing distance information as claimed in claim 1, further comprising time measurement means for measuring time data, and wherein said calculation means calculates distance data from the velocity data calculated by said calculation means and the time data measured by time measurement means, and further calculates a difference between the distance data which has been calculated from the velocity data and the time data and the real distance which has been calculated from the distance on the map and the scale reduction information, and said calculation means including means for causing said display means to display the difference calculated by said calculation means.

3. The display apparatus for processing distance information as claimed in claim 1, further comprising:

selection means for selectively displaying on said display means said television image and results calculated by said calculation means.

4. The display apparatus for processing distance information as claimed in claim 1, wherein the scale reduction information of the map input by said input means is selected from among a plurality of scale reduction information stored in said calculation means.

5. The display apparatus for processing distance information as claimed in claim 1, wherein said measurement unit comprises remote controller means for remote-controlling said television circuit means.

6. The display apparatus for processing distance information as claimed in claim 1, wherein said measurement unit includes said input means.

7. A display apparatus for processing distance information comprising:

an apparatus body;

a measurement unit, provided separately from said apparatus body, said measurement unit including distance measurement means for measuring a scaled distance on a map;

input means for inputting scale reduction information of the map and velocity information;

calculation means, provided in said apparatus body, for calculating a real distance from the scaled distance measured by said distance measurement means and the scale reduction information inputted by said input means, and for calculating time data from the calculated real distance and the velocity information inputted by said input means;

display means, provided on said apparatus body, for displaying the time data calculated by said calculation means; and television circuit means for displaying a television image on said display means, and tuning control means, included in said television circuit means, for controlling an operation of said television circuit means;

and wherein said calculation means is included in said tuning control means of said television circuit means.

8. The display apparatus for processing distance information as claimed in claim 7, further comprising time measurement means for measuring time data, and wherein said calculation means calculates a time difference between the time data calculated by said calculation means and the time data measured by said time measurement means, and controls said display means to display the calculated time difference.

9. The display apparatus for processing distance information as claimed in claim 7, further comprising:

selection means for selectively displaying on said display means said television image and results calculated by said calculation means.

10. The display apparatus for processing distance information as claimed in claim 7, wherein the scale reduction information of the map input by said input means is selected from among a plurality of scale reduction information stored in said calculation means.

11. The display apparatus for processing distance information as claimed in claim 7, wherein said measurement unit comprises remote controller means for remote-controlling said television circuit means.

12. The display apparatus for processing distance information as claimed in claim 7, wherein said measurement unit includes said input means.

13. A display apparatus for processing distance information comprising:

display means;

a television receiver circuit;

measurement means for measuring a scaled distance on a map;

input means for inputting scale reduction information of the map;

calculation means for calculating a real distance based upon the scaled distance measured by said measurement means and the scale reduction information inputted by said input means; and selection means for selectively displaying on said display means a television picture received by said television receiver circuit and the real distance calculated by said calculation means.

14. The display apparatus for processing distance information as claimed in claim 13, further comprising remote controller means, separate from said display means, for controlling an operation of said display apparatus, and wherein both said input means and said selection means are mounted on said remote controller means.

15. The display apparatus for processing distance information, comprising:

an apparatus body;

a measurement unit, provided separately from said apparatus body, said measurement unit including distance measurement means for measuring a scaled distance on a map;

input means for inputting scale reduction information of the map and time information;

calculation means, provided in said apparatus body, for calculating a real distance from the scaled distance measured by said distance measurement means and the scale reduction information inputted by said input means, and for calculating velocity data from the calculated real distance and the time information inputted by said input means;

display means, provided on said apparatus body, for displaying the velocity data calculated by said calculation means;

time measurement means for measuring time data;

wherein said calculation means calculates distance data from the velocity data calculated by said calculation means and the time data measured by said time measurement means, and wherein said calculation means includes means for causing said display means to display the calculated distance data; and television circuit means for displaying a television image on said display means;

and wherein said calculation means continues to calculate the distance data from the velocity data calculated by said calculation means and the time data measured by said time measurement means while said television circuit means displays the television image on said display means.

16. The display apparatus for processing distance information as claimed in claim 15, wherein said calculation means controls said display means to simultaneously display both the real distance which has been calculated from the scaled distance measured by said distance measurement means and the scale reduction information inputted by said input means, and the distance data which has been calculated from the velocity data calculated by said calculation means and the time.

17. A display apparatus for processing distance information comprising:

an apparatus body;

a measurement unit, provided separately from said apparatus body, said measurement unit including distance measurement means for measuring a scaled distance on a map;

input means for inputting scale reduction information of the map and velocity information;

calculation means, provided in said apparatus body, for calculating a real distance from the scaled distance measured by said distance measurement means and the scale reduction information inputted by said input means, and for calculating time data from the calculated real distance and the velocity information inputted by said input means;

display means, provided on said apparatus body, for displaying the time data calculated by said calculation means; and time measurement means for measuring time data;

wherein said calculation means calculates distance data from the velocity information inputted by said input means and time data measured by said time measurement means, and controls said display means to display the calculated distance data;

television circuit means for displaying a television image on said display means;

and wherein said calculation means continues to calculate distance data from the velocity data calculated by said calculation means and the time data measured by said time measurement means while said television circuit means displays the television image on said display means.

18. The display apparatus for processing distance information as claimed in claim 17, wherein said calculation means controls said display means to simultaneously display both the distance on the map measured by said distance measurement means and the distance data been calculated from the velocity information inputted by said input means and the time data measured by said time measurement means.

* * * * *